July 23, 1963     M. C. FERNANDEZ     3,099,008
SYSTEM OF CONTINUOUS RADIOLOCATION FOR AIRCRAFT
Filed March 1, 1957     4 Sheets-Sheet 1
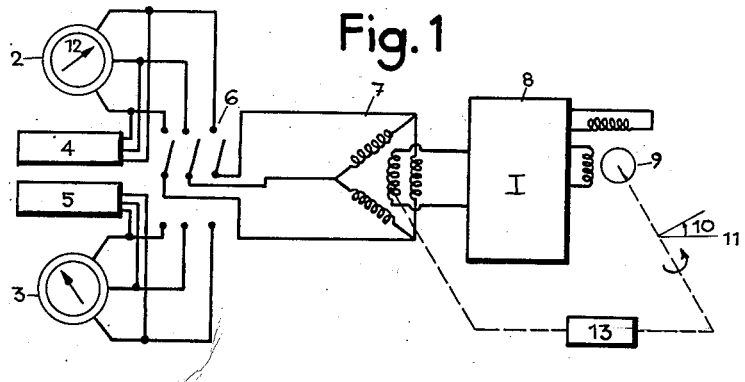
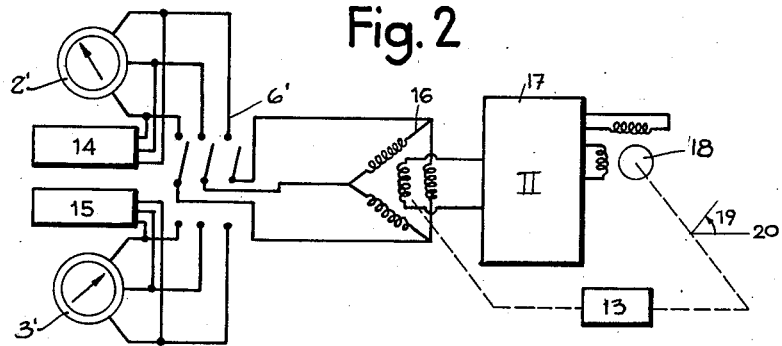
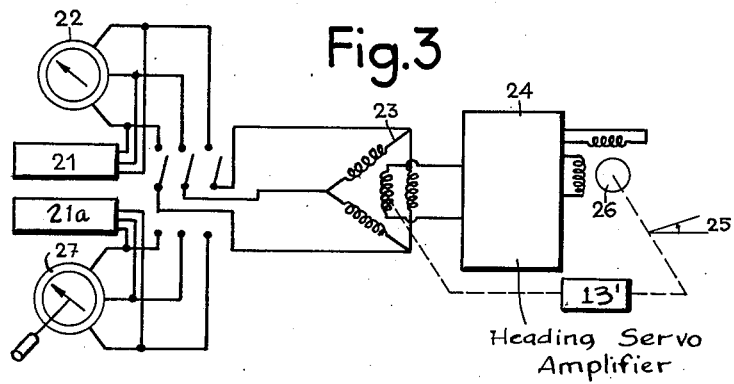

July 23, 1963   M. C. FERNANDEZ   3,099,008
SYSTEM OF CONTINUOUS RADIOLOCATION FOR AIRCRAFT
Filed March 1, 1957   4 Sheets-Sheet 2

July 23, 1963   M. C. FERNANDEZ   3,099,008
SYSTEM OF CONTINUOUS RADIOLOCATION FOR AIRCRAFT
Filed March 1, 1957   4 Sheets-Sheet 4

United States Patent Office 3,099,008
Patented July 23, 1963

3,099,008
SYSTEM OF CONTINUOUS RADIOLOCATION
FOR AIRCRAFT
Manuel Castro Fernández, Madrid, Spain, assignor of fifty percent to Carlos C. Goetz, Lisbon, Portugal
Filed Mar. 1, 1957, Ser. No. 643,374
Claims priority, application Spain Apr. 10, 1956
20 Claims. (Cl. 343—112)

The present invention relates to a new system of continuous radiolocation for aircraft.

Despite the numerous innovations made in electronic radio systems used by ships and aircraft to determine their position, there has not yet been devised a system that will indicate in a continuous and almost instantaneous manner, the position of said moving craft on a map, as heretofore the members of the crew have always been obliged to make a number of computations, utilizing certain data which either delay or render the precision of such determination useless after having accomplished same, for example, during the rapid cruising speed of an aircraft, as upon completion of said estimate, the aircraft has already surpassed the determined spot, so that an establishment of the position will result erroneous, and above all when under a heavy drift which at times is an unforseen phenomenon or difficult to determine, whereas in such cases where certain systems tend to comply with these exigencies, these generally require special conditions of propagation in the radio waves that are not always deemed appropriate or else require a number of ground installations provided with an assembly of extraordinarily expensive equipments.

The object of the present invention has been devised in order to surmount this problem and is constituted by a system comprising a housing for the controls, a servo-amplifier unit and an indicator which receives the high and low frequency signals emitted by the automatic radiogoniometers on board, transforming same into optical or mechanical signals that mark lines representing a direction bearing from a known point (hereinafter referred to as QTE) or lines of the geographical position produced in two radio beacons shown on the map, which to this effect are mounted to the indicator screen and whose intersection marks the exact position of the moving craft. Furthermore, there appears an optical or mechanical outline indicating the course or actual cruising line taken upon the surface of the map by the moving craft, so that rectifications of the course can be made instantaneously without any previous calculations. Should the moving craft, at any given moment, not be seen inside the zone covering the mop, the bearings QTE will then furnish a very appropriate idea of its position and moreover the outline of the moving craft would indicate the exact direction thereof, that is to say, whether it is cruising towards the desired spot or, on the contrary, that its course is not correct.

Hereinafter the new system will be described, both with respect to the transformation of the signals received by the automatic radiogoniometers on the bearing QTE or geographical lines, as also to ensure that these bearings fix their origin at any point of the map in which two of the radio beacons, utilized at any given moment, are situated.

The accompanying drawings furnish an idea of the general performance of the system towards which two low or high frequency signals, received by the radio beacons, are directed, as for example the so-called North American ADF equipments for low and medium frequencies and the VOR navigation equipments at high frequency, and a cruising signal from an electronic compass or in the lack thereof, from a manually operated system. The term "electronic compass" as used herein defines a magnetic compass which can send out electric impulses in accordance with mobile direction changes. These impulses will then cause corresponding reactions on indicators, instruments or electronic systems. The most well-known of such compasses is the so-called "flux-gate-compass."

In the drawings:

FIG. 1 is a combination schematic and block diagram showing the path of a signal received from a radio beacon;

FIG. 2 is a schematic and block diagram showing the path of a signal received from a second radio beacon;

FIG. 3 is a schematic and block diagram showing the path of the magnetic North signal;

Figure 4:
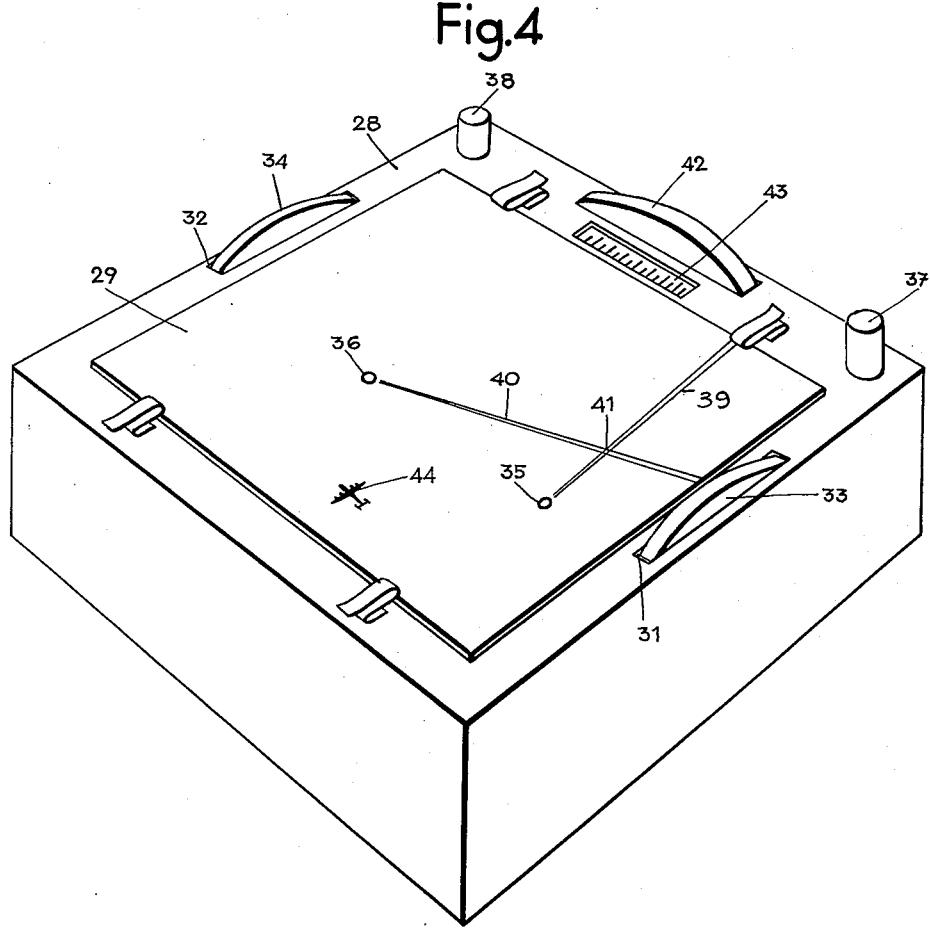
FIG. 4 is a perspective view of the housing.

FIG. 1 represents the principal diagram of the system showing therein: the synchronous repeaters 2 and 3 corresponding to a direction finder 4 (as to determine relative heading angular values) or to the VOR system 5. The VOR (visual omnirange) is a location device wherein the signals emitted from ground beacons are received and transformed into a visual representation to inform the pilot of his proximity in relation to the beacon. Here we take shunts from both stators and leading them towards a three pole switch 6 that feeds the stator of another repeater 7 with the signals received from the direction finder or radiogoniometer 4 or from the VOR system 5 in accordance with the position of the switch 6. The rotor of the repeater 7 is spliced to the entrance of the amplifier 8 of the servo-mechanism (titled in the drawings as servo-amplifier I) destined to move the motor 9 so that it will receive a rotation 10 with respect to a reference position 11 of the motor housing and identical with the bearing 12 indicated by the radiogoniometer or the VOR system in compliance with the nose of the aircraft or ship. As in all servo-mechanisms, the motor 9 is in this case spliced mechanically with the rotation of the repeater rotor 7, so as to provide the system, by means of gears 13, with the feedback required for said servo-mechanism.

An entirely identical system with synchronous repeaters 2', 3' and three pole switch 6' is destined to direct the signals from a second radiogoniometer 14 or VOR system 15 towards another repeater 16, servo-mechanism 17 (titled in the drawings as servo-amplifier II) and motor 18 that will furnish the bearing 19 with respect to the reference position 20 of its own housing to another syntonized station by means of the direction finder 14 or VOR system 15. During an extensive use of the equipment, each servo-mechanism will indistinctly receive the signal from an ADF or from a VOR system, from previously syntonized stations, each in accordance with the frequencies of the stations utilized and which are shown on the map, however, such craft as have means limited to one only goniometer receiver or to one only VOR system can also be utilized by directing towards a servo-mechanism the signal from one station and thereafter when this has indicated its QTE inject in the other servo-mechanism the signal from the other subsequently syntonized station, whereby the position will then be determined, although not with exactly the same precision.

Should the nose of the aircraft or ship point towards the north, while the magnetic variation is nil, then the angles 10, 19 described by the motors 9, 18 of the servomechanisms, minus 180 degrees, will be identical to the two QTE of the two syntonized stations, so that upon plotting or tracing on the map two lines forming said resultant angles with the northern direction of the map and having their origin in the geographical location of said stations, then we would obtain the position of the craft at the intersection point of the said two lines. The tracing of said lines is effected automatically, as will be described hereinafter, thereby disposing at all times of two QTE and consequently also of the position occupied by the craft at any desired moment.

Should the nose of the craft not be pointing north, that is to say, when there is a certain magnetic heading and furthermore a definite magnetic variation, it will then be necessary to add the sum of these two angles to the angle formed by the propagation line of the electromagnetic wave between the syntonized station and the nose to stern line, or the bearing and this sum from the magnetic heading with the bearing given by a radiogoniometer can be effected automatically, should the craft be provided with an electronic compass 21 of any type that will operate a repeater synchronous motor 22 similar to those utilized with direction finders. To this effect, shunts are taken from the stator of one of the repeaters 22 of the magnetic heading and are led towards a servo-amplifier system 23, 24 identical with such that are utilized with the direction finder or VOR system, heretofore described. Element 24 is entitled in the drawings as Heading Servo-Amplifier. The angle 25 described by the motor 26 of the servo unit corresponding to the electronic compass is added by means of gears that will be described hereinafter, to the angles 10, 19 or the bearings given by the two first-mentioned servo units 9, 18 destined to obtain the two bearings required to fix the position of the craft.

Should the craft not be provided with an electronic compass 21, it is then possible from the reading of magnetic compass 21a to manually control the rotor of a synchronous motor 27, of the auto or self-synchronizing type which, after an appropriate amplification of the signal by the corresponding servo unit 23, 24, will produce the rotation 25 of its motor 26 and consequently the sum of said angle 25 with the two bearings 10, 19 of the other two motors 9, 18, thereby obtaining the two angles required for location. A mechanical addition of the angle of magnetic variation is made, so that the bearings will not be submitted to said magnetic variation error, as will also be described by figures hereinafter.

FIG. 4 illustrates the manner in which the results are shown on the map. Upon a housing 28, provided wtih a large window 29, a map or a part thereof 30, at any desired scale, covering the navigation zone, is extended. This map or plan 30 should be slightly transparent, so as to enable a vision of the luminous tracings or lines applied to the lower portion thereof. Two laterally opposed slots 31, 32 are provided with protruding and knurled discs 33, 34 for a horizontal displacement of the rotary axes of luminous tracings, whose axes are indicated by color luminous spots 35, 36 corresponding to the situation of the stations on the map that are syntonized in order to determine the position of the craft. Two knobs or buttons 37, 38 are mounted to corresponding corners of the upper portion of the apparatus and are destined for the vertical displacement of said axes. By means of said discs and knurled buttons, the colored spots 35, 36 can be placed in correspondence with the rotary axes of the luminous tracings upon the spots in coincidence with the geographical situations of the two stations applied for the determination of the actual position of the craft.

Should the map or plan, extended upon said detector housing, be pointing north towards the upper portion of the indicator, then no rectification of the angles or QTE given by the two luminous tracings is required, as the intersection 41 thereof will at all times indicate the exact position of the craft, however, as on many occasions, plans are utilized wherein the north point does not coincide with the direction of the upper portion of the apparatus, it will then be necessary to effect a rectification of the angles which with respect to the upper portion of the indicator, are given by the two luminous tracings 39, 40, by adding thereto a supplementary rotation identical to that formed by the north point of the map with the vertical direction of the indicator, that is always known. This recification, as will be disclosed hereinafter, is made mechanically, by providing to this effect a protruding and knurled disc 42 mounted to the upper portion of the housing 28 and in the proximity of a graduated scale 43 that is applied for the measurement of said rectification.

This control disc furthermore serves to achieve a rectification of, or the sum of the magnetic variation, to which effect it will suffice to rotate same in identical degrees to those of the said magnetic variation that is supposed to exist within the navigation zone.

The silhouette or outline of the craft 44, advancing along its route on the map, is shown upon the screen of the indicator, by utilizing to this effect a mechanism that will be described hereinafter.

Figure 5:
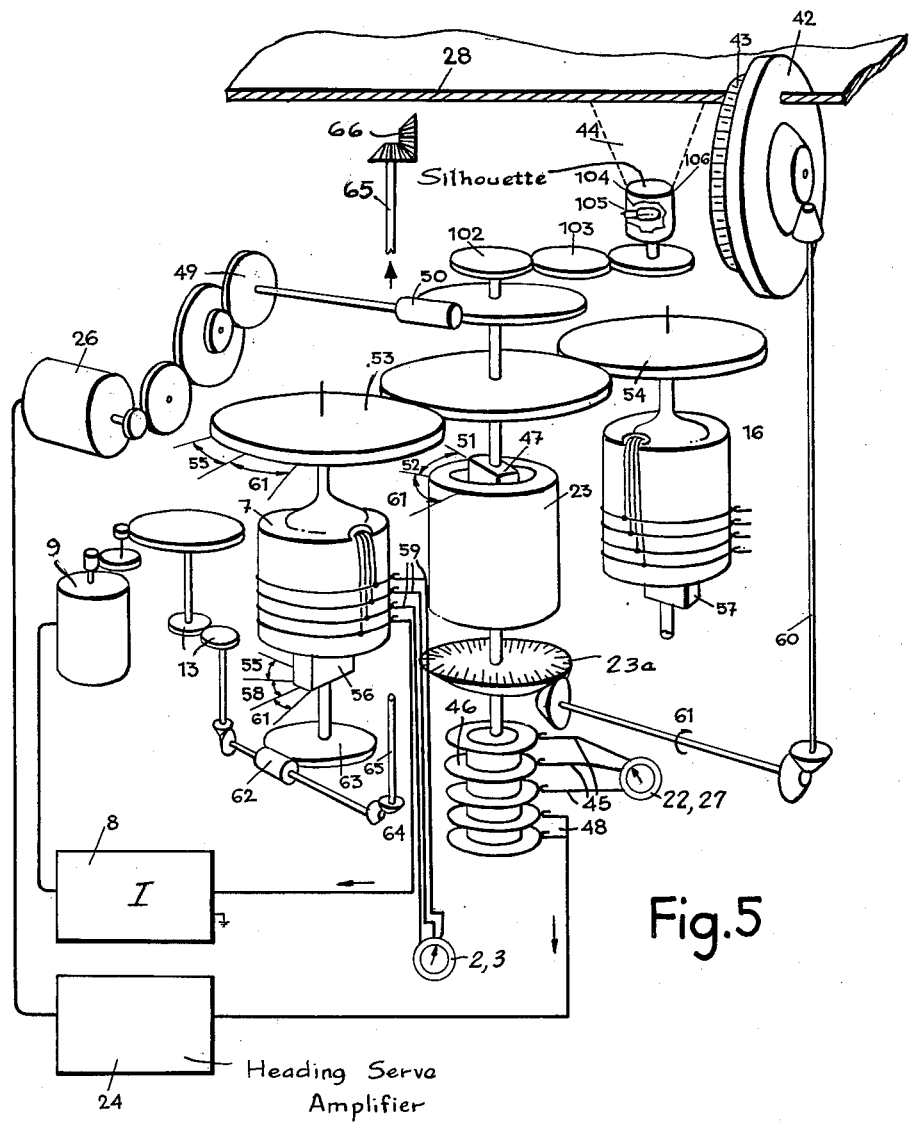
FIG. 5 is a showing of the mechanism used to sum up the angles of each bearing with that of the magnetic track and declination correction.

FIG. 5 represents the mechanism for summing up the angles of each bearing with that of the magnetic heading, as also that of the magnetic variation and the orientation of the map or plan.

The three connections 45 established by shunts taken from a repeater 22, FIG. 3 for the electronic compass 21, FIG. 3, excite the three windings of a stator 23 by means of appropriate collector rings 46, provided said stator 23 can be submitted to rotation. Should the magnetic heading be at zero and the map pointing north while the magnetic variation is likewise nil, it is then that this stator 23 will occupy a well determined position and thus its rotor 47 will be directed in an appropriate manner, as the induced voltage thereof or error signal of the corresponding servo-mechanism will flow through the connections 48, thereby exciting the corresponding amplifier 24 which will move the motor 26 and thus by means of the reducing gears 49, 50 (see FIG. 5 and 13' in FIG. 3) will rectify the orientation of the rotor 47 until this latter is properly oriented in accordance with the direction 51 of the field produced inside the repeater 23 by currents that are introduced through the conductors 45 of the repeater for the electronic compass. By this means the rotor 47 will align with the zero direction 51 of the stator 23.

When the compass points to a magnetic heading other than zero, the field inside the stator 23 will rotate at an angle 52 with respect to the shell of said stator so that a voltage is induced in its corresponding rotor 47 while a current of a determined phase and amplitude flowing through the conductors 48 amplifies same by means of the corresponding amplifier 24 which thus causes a rotation of the motor 26 until the rotor 47 is aligned in such a manner that there is no induced voltage whatsoever, by means of a rotation identical to that of the angle 52 in virtue of the graduation of the magnetic heading.

The rotation angle 52 produced by the magnetic heading in the rotor 47 is transmitted by means of the gears 53, 54 to the stator shells of another two synchronous repeater motors 7 and 16 so that the rotation 55 provides a like number of degrees and therefore the angle 58 formed by the magnetic field with the zero or reference direction of the stator 7 in virtue of the currents flowing through the brushes 59 from a repeater of an automatic radiogoniometer or from a VOR receiver being supplemented by this rotation 55 of the stator 7. This gives rise to an induced voltage in the rotor 56 which is led towards the amplifier 8 and from there to the motor 9 which in turn and by means of gears 13 rectifies the orientation of the rotor at an angle identical to that of 55, that is to say until a new equilibrium situation of zero induced voltage in the rotor 56 is obtained. Thereby the magnetic heading 52, 55 is added to the bearings or angles 58 which each rotor 56, 57 has with respect to its casing 7, 16.

Due to the rotation of the stator shells of said motors 7, 16 it will be necessary to make the electrical connections by means of annular contacts and the corresponding and appropriate brushes 59.

A knurled control disc 42 provided with a graduated scale 43 transmits by means of a spindle 60 its rotation to the stator shell of the repeater 23 as at scaled disc 23a and thus adds the angle of magnetic variation and orientation of the map, to which reference was made heretofore. This new angle 61 of the shell 23 affects its rotor 47 and by means of the gears 53, 54, the stator shells 7, 16 and therefore also the rotors 56, 47 that indicate the QTE. It is now required to transfer the total rotation of the rotors 56, 57 of the repeaters 7, 16 to the corresponding points of the map. To this effect, reference will first be made to the mechanical device utilized to transfer the rotation of each to the rotors 56, 57 that indicate the QTE to the luminous or mechanical indicators used to transfer same to the map, despite the transfer movements which said luminous projector or mechanical indications can undergo.

The motor 9 is controlled by the amplifier 8 that is excited by the signal induced in the rotor 56 of one of the two synchronous repeater motors 7. The motor 9 through a series of reducing gears 13 and bevel worms 62 transmits its movement by means of a sprocket 63 to the rotor 56 incessantly, until the rotor 56 is aligned with the field produced by the stator of its repeater motor 7 and which will have an orientation, as heretofore described that is identical to the sum of the magnetic track, bearing, magnetic variation and rectification of the map; this same rotation being transmitted through the bevel gear 64 to the spindle 65 and control mechanism for the movement of the luminous projectors located underneath the map and housing 28.

Figure 6:
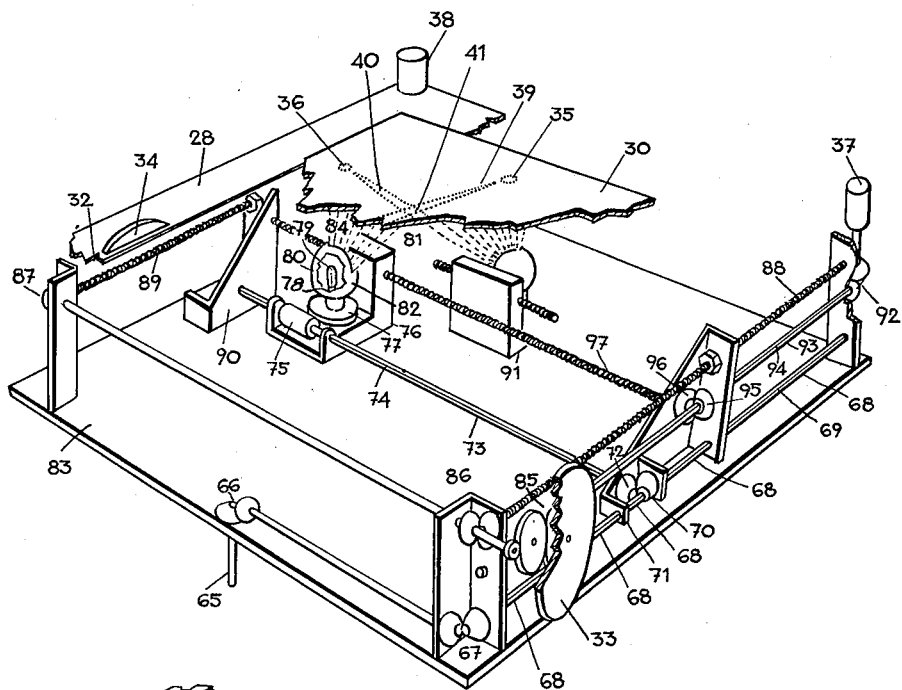
FIG. 6 is a perspective view of the housing with portions cut away.
Figure 7:
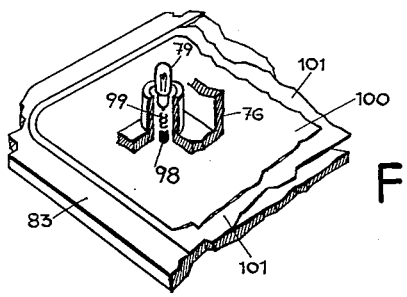
FIG. 7 is a perspective view of the bulb contacting structure with portions broken away.

With reference to FIGS. 6 and 7, it will be appreciated that this rotation is transmitted by means of a spindle 65, and that the bevel gears 66, 67 in turn transmit said rotation to another spindle 68 provided, along its entire length with a channel or groove 69 to which a bevel wheel 70 is keyed so as to enable a displacement thereof along said spindle 68 in coincidence with the rotary movements of this latter spindle. An angular bearing or journal on the carriage 71 insures a continuous engagement of said bevel wheel 70 with another bevel wheel 72 which thereby transmits the rotary movement of said spindle 68 to another spindle 73, although this is displaced in parallelism therewith and dragged along by the carriage 71, whose movement will be described hereinafter.

Said spindle 73 is also provided, along its entire length, with a channel or groove 74, so that a worm 75 keyed thereto, will acquire identical rotation to that of the gears 70, 72 during its longitudinal displacement on the said spindle 73 imposed by the action of a displacement in the direction of a carriage 76.

Finally, a rotary movement of the worm wheel 75 gives rise to rotary movement of a sprocket 77 together with its sleeve 78 and thereby also to a rotation of a small lamp 79, provided with a cap 80 having a slot 82 from the apex to near the base of the cap 80 through which a streak of light 81 is projected on to a transparent surface 30 mounted in parallel to a platform 83 and thus this streak of light 81 is converted into a luminous line 40. Note that the sleeve 78, lamp 79, cap 80, and slot 81 all rotate with respect to carriage 76 which does not rotate. The light penetrating through the transparent colored piece 84 thereby projects a luminous spot 36 that is displaced, as will be described hereinafter, until it coincides with the geographical position of the radio electrical station and thus syntonizes therewith. By this means, the light ray 40 which, after having made the appropriate adjustments, is emitted from the situation on the map of said station, will then represent the corresponding QTE line.

The transfer movement of the carriafe 76, corresponding to a radiogoniometer, can be displaced in two mutually perpendicular directions, by means of two appropriate adjustment knobs 37, 38 that are also shown in FIG. 4. The knurled disc 33, by means of a gear 85 and two bevel gears 86, 87, transmits its rotary movement to a pair of threaded rods 88, 89 and thereby a pair of threaded angular pieces 71, 90 are displaced simultaneously and in a parallel movement with the carriage 76 and said threaded rods 88, 89. A mechanism, of identical characteristics and mounted to the opposite side of the housing, permits a displacement of a second carriage 91, with a sufficient degree of movement, so that any point of the map or plan can be made to coincide with the intersection of said two QTE bearings projected thereupon by the corresponding lamps, utilizing to this effect exclusively the selection of the appropriate radio electrical station operating on either of the two carriages 76, 91, that is to say, each carriage can only move within the space left by the other. The discs 33 penetrate to a certain extent through an appropriate slot applied to the cover of the housing 28, situated on the left or right hand side margin, as is shown in FIG. 4.

In a perpendicular sense to said traverse movement of the carriage 76, another displacement can be obtained, as is indicated in FIG. 6, and wherein it is shown that by the rotation of a knob 37, the rotary movement thereof can be transmitted by means of a bevel wheel 92 to a spindle 93, provided with a longitudinal groove 94, so that another bevel wheel 95, during its displacement, can retain and follow the rotation controlled by said knob 37, and that thereby this movement can be transmitted by another bevel wheel 96 to the threaded rod 97, thus causing a displacement of the carriage 76, threaded thereto along the entire length of said threaded rod 97.

By the aforedescribed arrangement, it will be possible to situate the luminous spot 36, indicating the axis of the rotary movement of the QTE line, on the desired point of the map or plan without any further limitations than, should under any special circumstance, a carriage 76 not reach said position, the other carriage 91 could then be placed in said position, while the corresponding self-synchronizing motor 7 or 16, FIGS. 1, 2, should then have to be connected with the radio electrical station whose position coincides with the luminous spot 36 on the map. During the plotting of maps care should be taken that the radio electrical stations to be used will occupy a position that will not obstruct the movements of the carriages. In order to achieve a permanent connection of said pilot lamps 79 during all their movements, use is made of a contact 98 that is insulated from the mass in connection with the central portion of the lamp socket 79 and by means of a spring 99 to a plate (100) that is insulated from the mass by a dielectric plate 101 and in connection with an appropriate voltage source for the projection lamps.

The rotary movement produced by the magnetic heading upon the rotor spindle 47, FIG. 5, was heretofore increased by the rotation sum of the magnetic variation and orientation of the map, which was transferred by means of a rotary movement of the spindle 60 to the corresponding stator 23, whereby the orientation of the splicing disc 102 at all times coincides with the orientation of the nose of the craft with respect to the indicator surface so that, should this rotation be transferred, as shown on FIG. 5, by means of a gear 103 to a small projector 104, provided with a projection lamp 105, this light will then be projected through a transparent disc 106, upon which the silhouette or outline of an aircraft or ship is engraved, and inside which said system is mounted, achieving thereby a location, not alone of the position of the craft by intersection of the two QTE lines, but furthermore, the direction or approximate route, while excluding any possible drift of the craft, that can easily be determined by means of this new system.

What I claim is:

1. A system for continuous radiolocation aboard a craft comprising, in combination, a plurality of radio receivers each being tunable to the signal of a different ground station, certain of said receivers being selective and operative to receive higher frequency signals corresponding at least to those of omnirange radio beacons, means for determining within respective receivers various direction angles including bearing and direction finder angles of the craft with respect to the respective tuned ground station, a map display indicator housing and a translucent sheet mounted thereover in any selective geographic position and having a map and showing the navigation zone of the craft with the location of several ground stations including the ground stations tuned in the receivers, the indicator having a vertical reference line, a projector for each of said radio receivers and mounted in said housing, each of said projectors having means for projecting onto said sheet a luminous pattern comprising a dot and straight line passing through said dot, mechanical means for varying the location of said projectors in said housing for varying the location of projection of said luminous pattern upon said sheet to align said dots on said map with the corresponding ground stations, and projector control means connected to said means within said receivers for determining said direction angles and including therebetween synchro-servomechanism-mechanical transmission means, said mechanical transmission means having a servomechanism feedback and being connected to and operable on respective of said projectors for imparting angular displacement to each of said projectors, said control means including corrector means forming part thereof and operable thereon for imparting further angular displacement to each of said projectors, said corrector means including at least servomechanism-mechanical transmission means, last said mechanical transmission means having a feedback to last said servomechanism and being connected to said control means, the total of the angular displacement of each of said projectors including an algebraic sum of angles equivalent to a bearing angle formed by a line passing through the craft and the respective ground station with magnetic north direction, said bearing angle being the algebraic summation of angles equivalent to and comprised of the angle formed by the heading of the craft and a line passing through both the craft and the respective ground stations, and the angle formed by the heading of the craft and the magnetic north direction, plus the angle of map inclination formed by the geographic north-south line on the map with said vertical reference line, plus the angle formed by the magnetic variation existing in said navigation zone whereby said luminous lines projected on said map represent imaginary straight lines originating from said radio ground stations and passing through said craft, and whereby the intersection of said luminous lines gives a continuous indication of the geographic location of said craft.

2. In a system for continuous radiolocation aboard a craft as set forth in claim 1 wherein said means within respective radio receivers each comprises a direction finder angle indicator for indicating the reference direction of a respective ground station, and wherein said projector control means comprises: rotatable means provided with a stator and a rotor, at least three servomechanisms, two of said servomechanisms having two respective stators and rotors and forming part of said computer means for determining direction finder angles, said two servomechanisms having synchro means operatively connected to respective ones of said direction finder indicators for receiving rotation of two rotors of said two respective servomechanisms with respect to said reference directions and corresponding respectively to said direction finder angles, said two servomechanisms each having mechanical transmission means including feedback to the respective two rotors thereof and connected to the respective projectors, the third of said servomechanisms forming part of said computer means and including said rotatable stator and said rotor and being provided with mechanical transmission means with feedback to said rotor, the said third servomechanism being adapted to be operably controlled at least by compass signals, said rotor of the third servomechanism being connected to said stators of said two servomechanisms by the said mechanical transmission means of the third servomechanism at least for adding magnetic heading angle to corresponding of said direction finder angles and for controlling the position of corresponding rotors of said two servomechanisms, the said mechanical transmission means of said two servomechanisms connecting said two servomechanism rotors with respective of said projectors being adapted to control the angular position of the latter.

3. A system for continuous radiolocation aboard a craft as set forth in claim 2, said projectors each having gear means for rotating same, said mechanical transmission means of said two servomechanisms being connected respectively between said rotors of the two servomechanisms and said gear means of a respective projector for transmitting angular rotation of last said rotors to said respective projectors.

4. A system for continuous radiolocation aboard a craft as set forth in claim 2, said projector control means further comprising compass means defining a magnetic heading indicative of a magnetic direction, means for transmitting said magnetic heading of said compass means to said stator of the third servomechanism of said computer means, said rotor of the third servomechanism provided with said mechanical transmission means being connected thereby to said two servomechanisms to transmit angular rotation of said rotor to the stators of said two servomechanisms.

5. A system for continuous radiolocation aboard a craft as set forth in claim 4 where means are included for rotating said rotatable stator of the third servomechanism an angular amount corresponding to said angle of map inclination representing the angle formed by the north-south line and the vertical reference line position of said map indicator.

6. A system for continuous radiolocation aboard a craft as set forth in claim 5, including means for rotating said rotatable stator of the third servomechanism an angular amount corresponding to the angular value representing the magnetic variation of said navigation zone.

7. A system for continuous radiolocation aboard a craft as set forth in claim 6, including means for rotating said rotatable stator of the third servomechanism an angular amount of plus or minus 180 degrees.

8. A system for continuous radiolocation aboard a craft as set forth in claim 7 provided with means for projecting a silhouette of a craft upon said map, and means for controlling the angular displacement of said silhouette to continuously indicate the nose-tail position of the craft in relation to route on said map, said last mentioned means for controlling said angular displacement including coupling means with the rotor of the third servomechanism whereby the rotative movements of said silhouette correspond to the movement of said last mentioned rotor.

9. A system for continuous radiolocation aboard a craft as set forth in claim 1, said mechanical means for varying the location of said projectors comprising gears mutually mounted to act perpendicular to each other and having means for controlling same to adjust the position of said projectors relative to said map position of said ground stations.

10. A system for continuous radiolocation aboard a craft as set forth in claim 1, each of said projectors comprising a sleve mounted for rotation and having a slot therein and a light source mounted within said sleeve for rotation and reciprocation with said sleeve into a predetermined position for projecting through said slot said luminous beam, whereby said light source of each projector and said respective sleeves rotate simultaneously with said respective projectors.

11. A system for continuous radiolocation aboard a craft as set forth in claim 4, said compass means including a magnetic compass for obtaining magnetic direction values and means for transmitting the magnetic heading values thereof.

12. A system for continuous radiolocation aboard a craft as set forth in claim 11 wherein said last mentioned means include servo-devices.

13. A system for continuous radiolocation aboard a craft as set forth in claim 4, said compass means including a magnetic compass for obtaining magnetic direction values, and manually operable means adjustable to a position corresponding to said magnetic values, and further means for transmitting the said magnetic heading from said manual means.

14. A system for continuous radiolocation aboard a craft as set forth in claim 13 wherein said further means include servo-devices.

15. A system for continuous radiolocation aboard a craft as set forth in claim 4, said compass means comprising a magnetic compass for obtaining magnetic direction values, manual means adjustable to positions corresponding to the said magnetic direction values, at least a servo-device for said manual means comprising a 360 degree graduated disc and a needle manually adjustable into a position of said disc corresponding to a value of said magnetic compass, said servo-device having a synchronous motor with the rotor thereof connected for synchronous rotation with said needle and operably connected for supplying said magnetic heading to said stator of the third servomechanism of said computer means.

16. In a system for continuous radiolocation aboard a craft as set forth in claim 1 wherein said means within respective radio receivers each comprises a direction angle indicator for indicating the reference direction of a respective ground station, and wherein said projector control means comprises: computer means provided with a rotatable stator and a rotor, at least three servomechanisms, two of said servomechanisms having two respective stators and rotors and forming part of said computer means for determining directional angles, said two servomechanisms having synchro means operatively connected to respective ones of said direction angle indicators for receiving rotation of two rotors of said two respective servomechanisms with respect to said reference positions and corresponding respectively to said direction angles, said two servomechanisms each having mechanical transmission means including feedback to the respective two rotors thereof and connected to the respective projectors, the third of said servomechanisms forming part of said computer means and including said rotatable stator and said rotor and being provided with mechanical transmission means with feedback to said rotor, the said third servomechanism being adapted to be operably controlled by corrector means, said rotor of the third servomechanism being connected to said stators of said two servomechanisms by the said mechanical transmission means of the third servomechanism for adding corrective angles to corresponding of said directional angles and for controlling the position of corresponding rotors of said two servomechanisms, the said mechanical transmission means of said two servomechanisms connecting said two servomechanism rotors with respective of said projectors being adapted to control the angular position of the latter.

17. In a system for continuous radiolocation aboard a craft, the combination of radio receivers for high frequency signals and tunable to VHF omni-range ground stations, said receivers having means to receive signals determinative of bearing angles of the craft with respective of said ground stations, a map display indicator having a translucent sheet mounted thereover in any selective geographic position and having a map and showing the navigation zone of the craft with the location of several ground stations including the ground stations tuned in the receivers, said indicator having a vertical reference line, a projector for each of said radio receivers and mounted in said housing, each of said projectors having means for projecting onto said sheet a luminous pattern comprising a dot and straight line passing through said dot, mechanical means for varying the location of said projectors in said housing for varying the location of projection of said luminous pattern upon said sheet to align said dots on said map with the corresponding ground stations, control means for each projector connected to said means to receive signals and including therebetween synchro-servomechanism-mechanical transmission means, said transmission means having feedback to said servomechanism and being connected to and operable on respective of said projectors for imparting angular displacement to each of said projectors, and corrector means forming part of and operable on said control means for imparting further angular displacement to each of said projectors, said corrector means including at least servomechanism-mechanical transmission means, last said transmission means having a feedback to its corresponding servomechanism and being connected to the first above-mentioned servomechanism, the total of the angular displacement including the algebraic sum of the bearing angle with respect to each station plus other corrections including the angle of map inclination formed by the geographic north-south line on the map with the vertical reference line on the indicator plus the angle of magnetic variation existing in the zone of navigation whereby said luminous lines projected on said map represent imaginary straight lines originating from said radio ground stations and passing through said craft and whereby the intersection of said lines gives a continuous indication of the geographic location of the craft.

18. In a system for continuous radiolocation aboard a craft as set fourth in claim 17 wherein the corrector means include a selective manually operable compass system electrically connected to the servomechanism of the corrector means and comprising a synchro transmitter having a 360 degree graduated disc and a needle manually adjustable into a position of said disc corresponding to a compass heading, the rotor of said transmitter being connected for synchronous rotation with the needle, said needle being set to zero position for compass heading references.

19. In a system as set forth in claim 18 wherein mechanical means connected to the corrector servomechanism are provided for an angular displacement correction of plus or minus 180 degrees.

20. In a navigation system for projecting light-beams on a screen from a plurality of projectors, each of said beams representing bearing lines from a respective ground station to craft to obtain craft positions at beam intersections, including the steps of feeding a directional angle value involving a line component from a ground station to craft into a projector control servomechanism, feeding corrective angular values with respect to said direction angle value into a corrector servomechanism, connecting said servomechanisms for angular summation at the control servomechanism, and mechanically transferring said summation from the control servomechanism to the projector for corresponding angular rotation thereof.

References Cited in the file of this patent

UNITED STATES PATENTS

| 2,485,663 | Rusch | Oct. 25, 1949 |
| 2,637,848 | Cunningham | May 5, 1953 |
| 2,692,377 | Brettell | Oct. 19, 1954 |
| 2,714,199 | Adams | July 26, 1955 |

OTHER REFERENCES

Radar Scanners and Radomes (Cady, Karelitz, Turner), published by McGraw-Hill, 1948 (page 9 relied on).

"Air Navigation," U.S. Navy Hydrographic Office, H.O. Pub. No. 216, 1955, U.S. Government Printing Office, Washington, D.C., page 99 relied on.